United States Patent [19]
Wolf et al.

[11] Patent Number: 4,970,463
[45] Date of Patent: Nov. 13, 1990

[54] TEMPERATURE STABLE PROXIMITY SENSOR WITH SENSING OF FLUX EMANATING FROM THE LATERAL SURFACE OF A MAGNET

[75] Inventors: Ronald J. Wolf, Goshen; Larry Hedeen, Howe, both of Ind.

[73] Assignee: Durakool Incorporated, Elkhart, Ind.

[21] Appl. No.: 322,518

[22] Filed: Mar. 13, 1989

[51] Int. Cl.$^5$ .......................... G01B 7/14; G01B 7/30; G01P 3/42
[52] U.S. Cl. ................................. 324/207.2; 324/174; 324/207.12; 324/207.14; 324/235
[58] Field of Search ............... 324/173, 174, 207, 208, 324/235, 251, 252, 207.12, 207.14, 207.2, 207.21, 207.25, 207.26; 328/32 R, 32 H; 307/309; 73/DIG. 3, 518-520

[56] References Cited

U.S. PATENT DOCUMENTS

| | | |
|---|---|---|
| 2,942,177 | 6/1960 | Neumann et al. |
| 2,987,669 | 6/1961 | Kallmann |
| 3,060,370 | 10/1962 | Varterasian |
| 3,613,000 | 10/1971 | Weir et al. ........................ 324/174 |
| 3,902,144 | 8/1975 | Alich ............................ 324/207 X |
| 4,039,936 | 8/1977 | Jones et al. ...................... 324/208 |
| 4,086,533 | 4/1978 | Ricouard et al. ................. 324/208 |
| 4,093,917 | 6/1978 | Haeussermann ................. 324/173 |
| 4,107,604 | 8/1978 | Bernier ........................... 324/207.2 |
| 4,229,696 | 10/1980 | Gustafson ........................ 324/207 |
| 4,518,918 | 5/1985 | Avery ........................... 324/251 X |
| 4,535,289 | 8/1985 | Abe et al. ...................... 324/235 X |
| 4,731,579 | 3/1988 | Petersen et al. ................. 324/207 |

FOREIGN PATENT DOCUMENTS

| | | | |
|---|---|---|---|
| 3636079 | 5/1988 | Fed. Rep. of Germany ...... 324/208 |
| 0034755 | 3/1977 | Japan .............................. 324/174 |
| 0006153 | 1/1987 | Japan .............................. 324/235 |
| 0006155 | 1/1987 | Japan .............................. 324/235 |
| 0006159 | 1/1987 | Japan .............................. 324/235 |

OTHER PUBLICATIONS

Moskowitz, Lester R., "Selecting Magnets for Reed Switch Actuation," Automation, Oct. 1968, pp. 66-71.

*Primary Examiner*—Gerard R. Strecker
*Attorney, Agent, or Firm*—Mason, Kolehmainen, Rathburn & Wyss

[57] ABSTRACT

A ferrous object sensor assembly is capable of sensing the presence or absence of an object of high magnetic permeability, such as a tooth or notch on a rotatably mounted ferrous wheel at zero speed and immediately upon power-up and, thus, may also be used as a proximity sensor. The ferrous object sensor assembly is comprised of a permanent magnet and a magnetic flux responsive sensor having a sensing plane which produces an electrical output signal which varies as a function of the change in magnetic flux density. The ferrous body sensor assembly does not rely upon pole face magnetism as some known conventional sensors but, rather, relies upon a the radial component of magnetic flux density emanating from a lateral surface of the magnet, intermediate opposing pole faces. Since the ferrous object sensor assembly does not rely on pole face magnetism, its electrical output signal is relatively stable over a relatively wide temperature range.

54 Claims, 3 Drawing Sheets

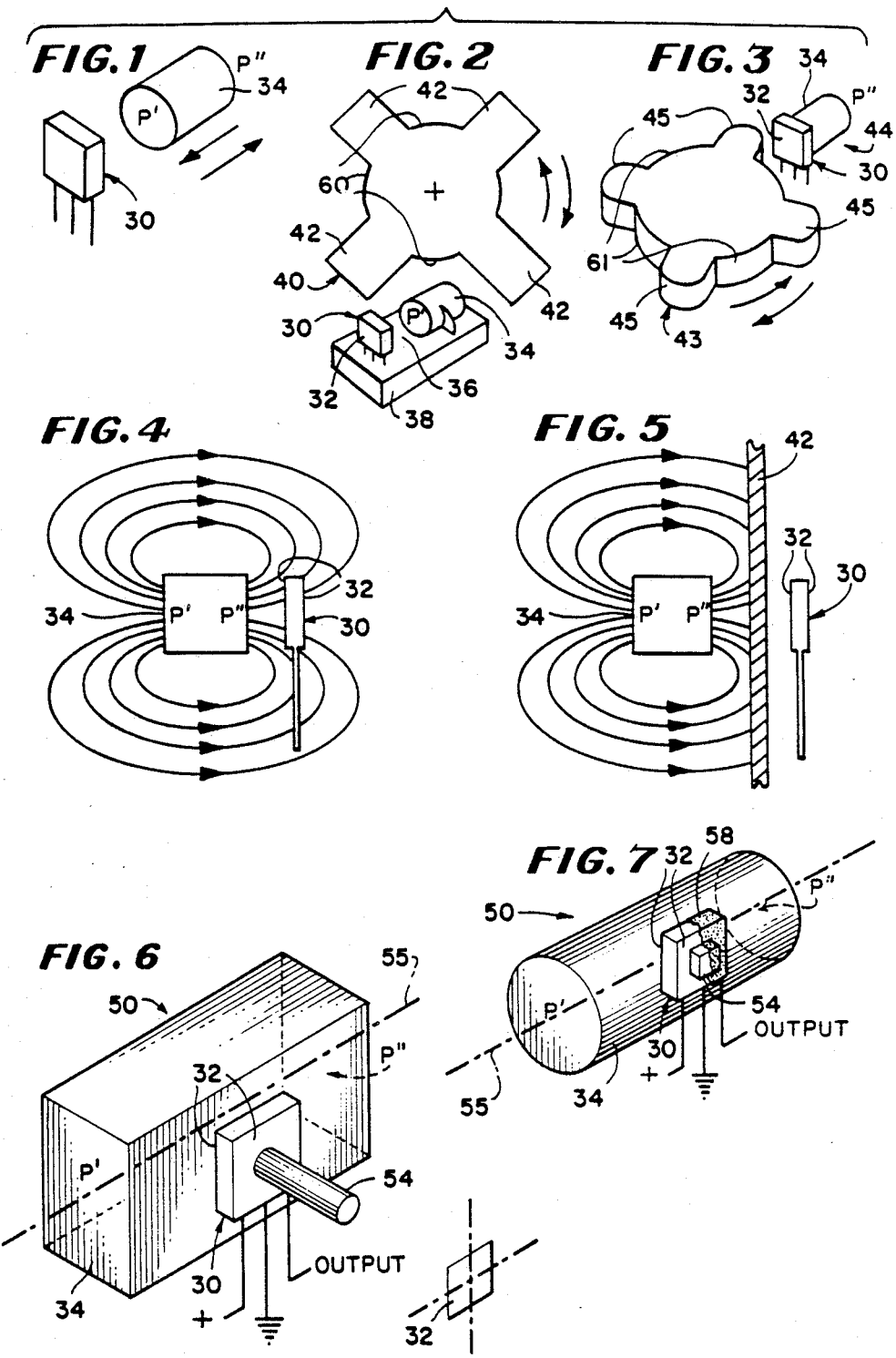

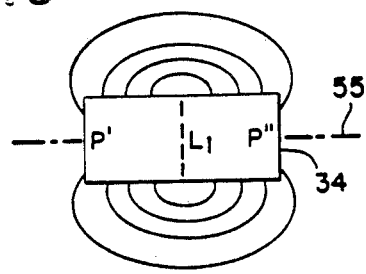
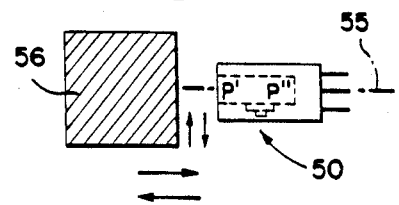
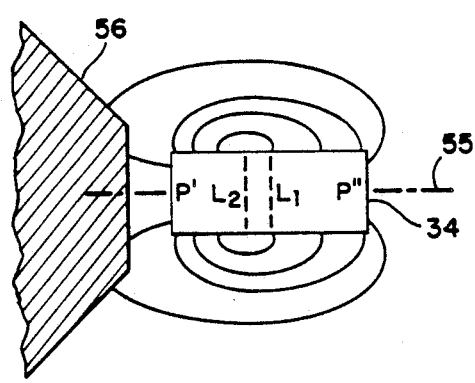
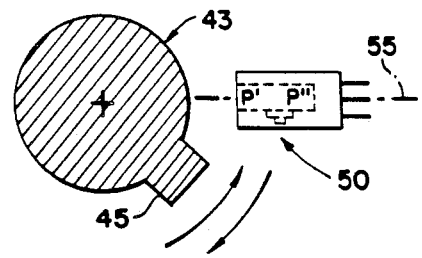
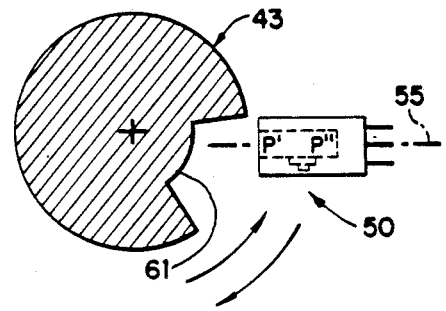
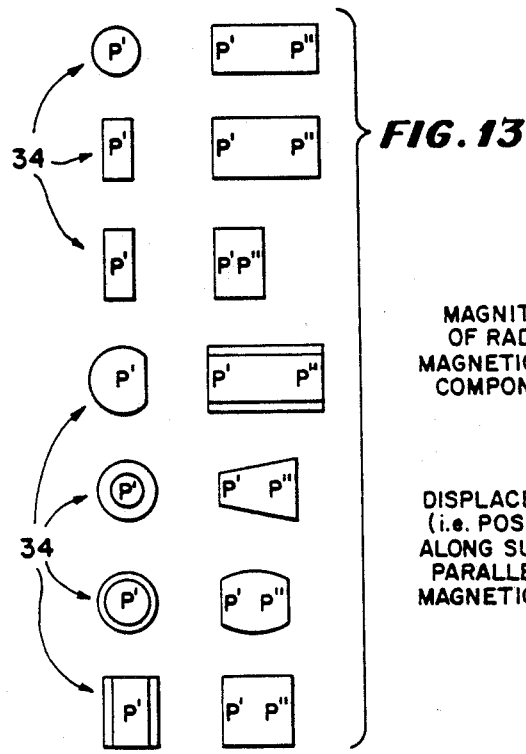
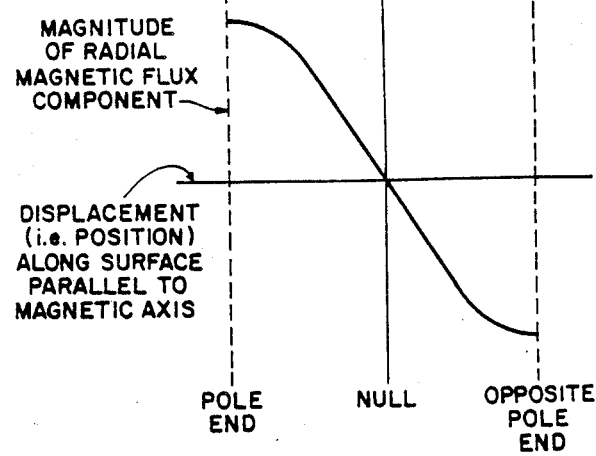

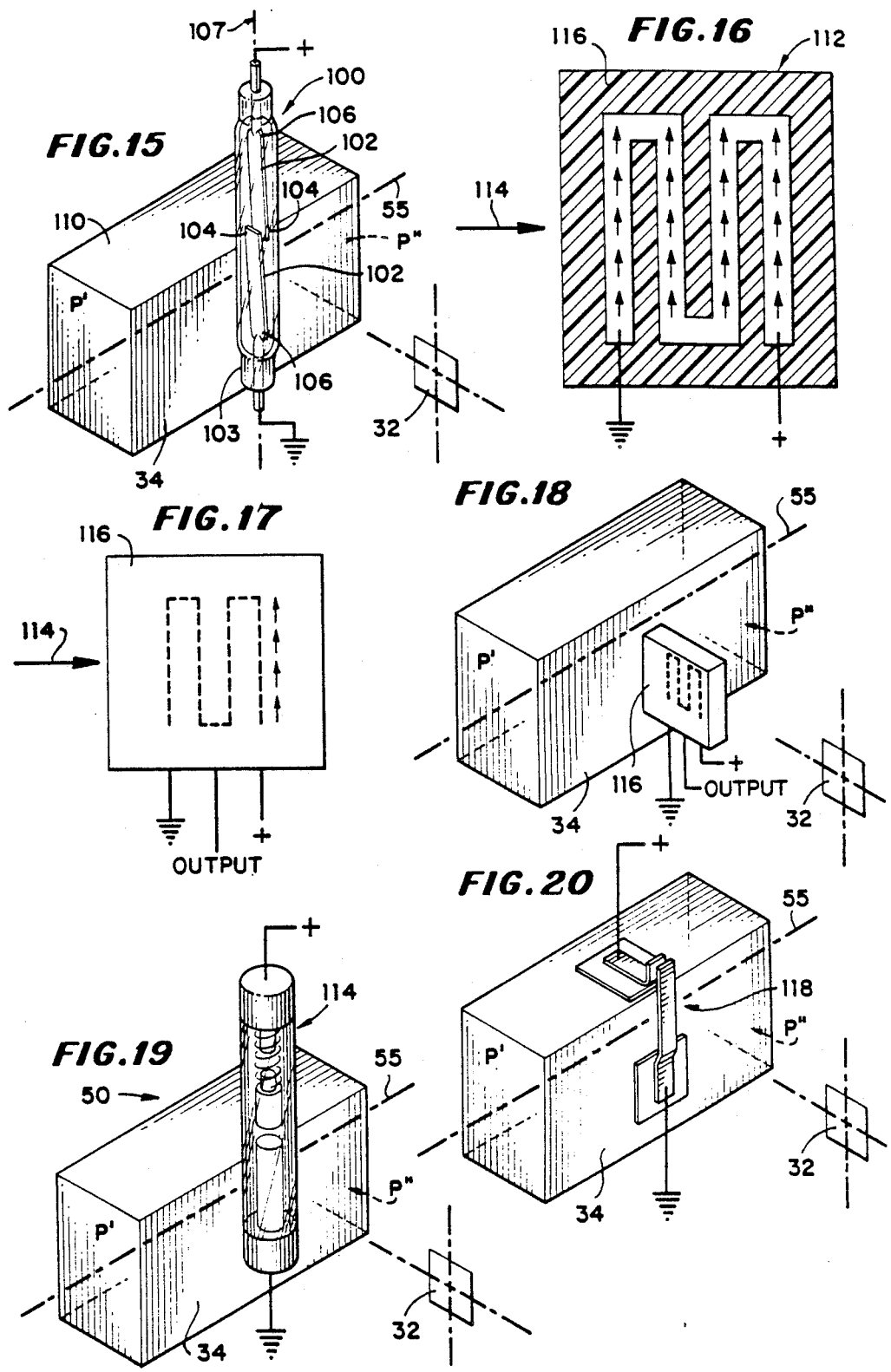

TEMPERATURE STABLE PROXIMITY SENSOR WITH SENSING OF FLUX EMANATING FROM THE LATERAL SURFACE OF A MAGNET

BACKGROUND OF THE INVENTION

1. Field of the Invention

The present invention relates to a ferrous object sensor assembly capable of end on sensing of a ferrous object including a tooth or notch on a ferrous wheel or vane at zero speed and immediately upon powerup and, more particularly, to a ferrous object sensor assembly comprising a magnetic flux responsive sensor having a sensing plane which provides an electrical output signal which varies as a function of the change in magnetic flux density applied to the sensing plane. The ferrous object sensor is disposed adjacent a lateral surface of a magnet, intermediate opposing pole faces and is responsive to radial magnetic flux components emanating from the lateral surface.

2. Description of the Prior Art

Some known magnetic flux responsive sensors, such as Hall effect sensors, are used as proximity sensors. Such sensors are used to detect the presence or absence of a magnet, for example, as illustrated in FIG. 1. These sensors rely on the change of magnetic flux density applied to the sensing plane of the sensor.

Other known Hall effect sensors are used in a wide variety of applications to detect the presence of a tooth or notch on a ferrous vane wheel, such as shown in FIG. 2. Such sensors are incorporated into assemblies and used, for example, in the automobile industry for breakerless ignition timing sensing circuitry. In this application, the Hall effect sensor 30 is mounted on a carrier 38. A magnet 34 is mounted a fixed distance from the sensing plane 32, defining an air gap 36 and forming an assembly. In this application, a ferrous vane wheel 40 having one or more teeth 42 is rotatably mounted with respect to the air gap 36 so that the teeth 42 pass through the air gap 36 when the ferrous vane wheel 40 is rotated. When a tooth 42 is disposed in the gap 36, the magnetic field is shunted away from the sensor 30 changing the magnetic flux density applied to the sensing plane. This ferrous vane wheel principle is best understood with reference to FIGS. 4 and 5. FIG. 4 represents the magnetic flux pattern of the assembly, illustrated in FIG. 2, across the air gap 36. In the absence of a tooth 42, the magnetic field is applied directly to the sensing plane surface 32 of the sensor 30. FIG. 5 represents a condition where a tooth 42 is disposed between a pole face and the sensing plane 32 of the sensor 30. In this situation, since the reluctance of the tooth 42 is much less than the reluctance of air, the tooth 42 shunts the magnetic field away from the Hall effect sensor 30.

The Hall effect sensors used in the applications shown in FIGS. 1 and 2 operate as a function of the change in magnetic flux density. In other words, the Hall effect sensor is responsive to a predetermined level of magnetic flux density at a predetermined polarity. When such a level is present, the Hall effect sensor will provide an output voltage signal representing either the presence or absence of a permanent magnet body (FIG. 1) or of a ferrous body (FIG. 2). Accordingly, such Hall effect sensors are typically used for proximity sensing.

The Hall effect sensor, illustrated in FIG. 1, relies on a moving magnet with respect to a Hall effect sensor. Such an approach is relatively inconvenient and may present various technical difficulties. For example, in order to use such sensors to detect rotating members, a series of magnets would have to be mounted on the periphery of the rotating members. This would be relatively expensive and inconvenient. An application, such as illustrated in FIG. 2, requires relatively precise alignment of the ferrous vane wheel with respect to the air gap to prevent collisions between the ferrous vane wheel, the magnet and the sensor.

FIG. 3 represents another known application of a conventional Hall effect sensor used to detect teeth or notches on a ferrous wheel. In this application, one pole face of a magnet 34 is disposed adjacent the Hall effect sensor 30 forming an assembly 44. The assembly 44 is rigidly mounted with respect to the ferrous wheel 43. As the individual teeth 45 pass near the sensing plane 32 of the sensor 30, the magnetic flux varies. More specifically, as a tooth 45 passes adjacent the sensing plane 32, the magnetic field density is increased through the sensor 30. When a notch 61 (or area between contiguous teeth 45) is disposed adjacent the sensing plane 32, the magnetic field density applied to the sensing plane 32 decreases. Such a Hall effect sensor 30 is thus able to provide an output voltage signal representative of the presence of a tooth 45 or notch 61.

However, when used as in FIG. 3, the small output signal values available from Hall effect sensors (and MRE's) often make it desirable to further amplify the output signal so that the sensor assembly provides a final output signal of high signal to noise ratio. Such an amplified output signal mitigates the need for specialized filtering circuits or special transmission cable, thus potentially reducing overall system cost. Therefore, such known Hall effect sensors, such as found in a Sprague type UGN-3503U, are capacitively coupled to an amplifier which boosts the output voltage signal to a much higher level. Since coupling capacitors are regulated by a resistive capacitive time constant, the output of such a Hall effect sensor assembly provides an output voltage signal representative of the change in magnetic flux density with respect to time. Thus, such Hall effect sensor assemblies cannot be used to detect a tooth or notch on a ferrous wheel at either zero speed or very high speeds. In such an application, for proper operation, the speed of the ferrous wheel would depend on the capacitor time constant. Accordingly, such Hall effect sensor assemblies cannot be used as proximity sensors.

All three Hall effect sensor applications, illustrated in FIGS. 1-3, rely on pole face magnetism. In other words, the magnetic flux emanating from a pole face is used to provide the required magnetic flux density to actuate the Hall effect sensor. However, it is known that at the pole face, temperature induced magnetic flux density change is significant. Thus, such devices can provide erratic output voltage signals when used in an environment subject to a wide range of temperatures, such as an automobile transmission or engine.

SUMMARY OF THE INVENTION

It is an object of the present invention to provide a ferrous object sensor assembly which solves the problems associated with the prior art.

It is yet a further object of the present invention to provide a ferrous object sensor assembly capable of sensing a tooth or notch on a ferrous wheel disposed adjacent the sensor assembly.

It is yet another object of the present invention to provide a ferrous object sensor assembly which does not depend on a moving magnet with respect to the sensor.

It is yet another object of the present invention to provide a ferrous object sensor assembly which can be used as a proximity sensor.

Briefly, the present invention relates to a ferrous object sensor assembly capable of end on sensing of various ferrous objects, such as the presence of a tooth or notch on a ferrous vane or wheel at zero speed and may also be used as a proximity sensor of these and other ferrous objects. The ferrous object sensor assembly is comprised of a magnetic flux responsive sensor having a sensing plane, disposed adjacent the lateral surface of a permanent magnet, intermediate opposing pole faces, forming an assembly such that radial magnetic flux components substantially perpendicular to the lateral surface are applied to the sensing plane. The ferrous object sensor assembly provides an electrical output signal as a function of the change in magnetic flux density applied to its sensing plane. Since the magnetic flux responsive sensor of the sensor assembly is not disposed at the pole face and since it does not rely substantially upon pole face magnetic flux, the magnetic flux density change due to temperature is insignificant. Thus, its output signal is relatively stable over a wide temperature range.

DESCRIPTION OF THE DRAWING

These and other objects of the present invention can be readily understood with reference to the following drawing and accompanying text, wherein:

FIG. 1 is a perspective representation of a conventional Hall effect sensor which relies on a moving magnet for operation;

FIG. 2 is a perspective representation of another conventional application of a Hall effect sensor assembly wherein the magnet is spaced apart from the Hall effect sensor defining a gap through which teeth of a ferrous vane wheel must pass;

FIG. 3 is a perspective representation of yet another conventional application of a Hall effect sensor assembly for sensing the presence of a tooth or notch on a ferrous wheel;

FIG. 4 illustrates a magnetic field pattern across the air gap between a magnet and a Hall effect sensor assembly of FIG. 2;

FIG. 5 illustrates the magnetic field pattern of FIG. 4 when a ferrous tooth is disposed between the magnet and the Hall effect sensor;

FIG. 6 is a perspective view of an embodiment of a ferrous object sensor assembly in accordance with the present invention which includes a Hall effect sensor;

FIG. 7 is a perspective view of an alternative embodiment of the ferrous object sensor assembly illustrated in FIG. 6;

FIG. 8 illustrates the magnetic field pattern of a permanent magnet;

FIG. 9 illustrates the magnetic field pattern of the permanent magnet in the presence of a ferrous object disposed adjacent a pole face;

FIG. 10 illustrates a ferrous object sensor assembly in accordance with the present invention used as a proximity sensor of a ferrous object;

FIG. 11 illustrates a ferrous object sensor assembly in accordance with the present invention used for sensing a tooth on a ferrous wheel;

FIG. 12 illustrates a ferrous object sensor assembly in accordance with the present invention used to sense a notch on a ferrous wheel;

FIG. 13 illustrates some of the various shapes of magnets which may be used to form a part of the present Hall effect sensor assembly in accordance with the present invention;

FIG. 14 is a curve representative of the radial component of the magnetic flux density at the surface of a magnet having a uniform cross-section on the vertical axis versus displacement along the lateral surface of the magnet, parallel to the magnetic axis;

FIG. 15 is a perspective view of an alternative embodiment of the present invention which includes a reed switch;

FIG. 16 is a perspective view of a magneto resistive element (MRE) where the small aligned arrows represent the magnetization orientation of the element and the presence of an external magnetic flux;

FIG. 17 is an elevational view of a magneto resistor sensor (MRS) which incorporates an MRE;

FIG. 18 is a perspective view of an alternative embodiment of the present invention which includes an MRE;

FIG. 19 is a perspective view of another alternative embodiment of the present invention which includes an axial contact switch; and FIG. 20 is a perspective view of another alternative embodiment of the present invention which includes a magnetic leaf switch.

DETAILED DESCRIPTION

Various magnetic flux responsive sensors are known; such as Hall effect sensors, and discrete, hybrid or integrated circuits comprising Hall effect sensors, reed switches, magnetically variable resistor elements (MRE), magnetically variable resistor sensors (MRS, such as a hybrid, discrete or integrated circuit including an MRE), and magnetic axial contact switches and the like. Such sensors all provide an electrical output signal in response to a change in magnetic flux density applied to its sensing plane.

A Hall effect sensor, for example, relies on the effect of a magnetic field on a semiconductor. More specifically, in a Hall effect sensor if a constant voltage is applied across a thin sheet of semiconductor material, it will cause a constant Hall bias current to flow. When such a semiconductor material is placed in a magnetic field with flux lines at approximately right angles to the plane of the Hall bias current, an output voltage, directly proportional to the magnetic field density, is produced across the output terminals. Some known Hall effect sensors are formed into integrated circuits (IC) which may also contain a current regulator for providing a constant magnitude of current, a voltage regulator, signal conditioning circuitry and an output transistor to provide for a switching type operation.

As used herein, the term "Hall effect IC" refers to a device which incorporates a Hall effect sensor (as previously defined) and other circuitry, such as an amplifier, signal conditioning circuitry and the like disposed in an integrated package, such as a Sprague model No. UGN-3040. A Hall effect assembly refers to a Hall effect IC (or a Hall effect sensor alone or with, hybrid and discrete circuitry forming the equivalent of a Hall effect IC) in combination with a permanent magnet and other components.

A ferrous object sensor assembly refers to the combination of a magnetic flux responsive sensor and a permanent magnet and may also include a flux concentrator and electronic circuitry. The term ferrous object sensor assembly is intended to cover various embodiments of such a combination, including discrete components, integrated circuits, thick film and thin film technology or any combination thereof.

As used herein, a magnetic axis 55 refers to the longitudinal axis between opposing pole faces as illustrated in FIG. 7. Also, the permanent magnets 34 are shown with opposing pole faces P, and P''. These designations are used throughout to represent that either pole face may represent a north pole or a south pole.

There are various types of Hall effect IC's available. For example, there are switching type Hall effect IC's which turn on or operate in the presence of a magnetic field and turn off or are released when the magnetic field is removed. Another type of Hall effect IC is a latching type device. In this device, the IC is turned on in the presence of a magnetic field of a given polarity and turned off in the presence of a magnetic field of the opposite polarity. There are also linear Hall effect IC's which provide an output voltage signal, linearly proportional to the change in the applied magnetic field. As will be understood by those of ordinary skill in the art, the principles of the invention are applicable to all types of Hall effect sensors and Hall effect IC's.

In all of the known applications of Hall effect sensors and IC's used for sensing ferrous objects as shown in FIG. 3, such devices rely upon pole face magnetism for proper operation. Pole face magnetism refers to directing the magnetic field from one of the pole faces of the permanent magnet through a sensing plane 32 on a Hall effect sensor 30. As is known by those of ordinary skill in the art, pole face magnetism is sensitive to temperature change. In applications where a Hall effect IC is used, for example, in a transmission or timing circuit in an automobile, such sensors can provide variable responses as a result of wide temperature ranges encountered affecting the magnetic flux density in such applications. The Hall effect assembly in accordance with the present invention mitigates this problem by providing a ferrous object sensor assembly relatively unaffected by temperature. The Hall effect sensor of the assembly in accordance with the present invention does not rely directly upon pole face magnetism as in known applications, such as shown in FIG. 3, but rather, relies upon magnetism which emanates from a lateral surface of the permanent magnet, intermediate the opposing pole faces.

Referring to FIGS. 6 and 7, two embodiments of a ferrous object sensor assembly 50 are illustrated. It is to be understood that the principles of the invention are equally applicable to a Hall effect sensor in combination with electrical circuitry of multiple leads or a three lead Hall effect IC. For simplicity only a Hall effect IC is described and illustrated. The ferrous object sensor assembly 50 includes a conventional Hall effect IC 30, such as a Sprague Model No. UGN-3131, UGN-3050 or a Siemens No. TLE 4903F and a permanent magnet 34. Such Hall effect IC's heretofore have only been used in applications as illustrated in FIGS. 1 and 2. These Hall effect IC's 30 are heretofore not known to have been used in an application, when disposed as in assembly 44 as illustrated in FIG. 3. Other known Hall effect IC's, such as a Sprague Model UGN-3503U, have been conventionally used in such an application. However, due to the relatively small sensor output signal in many applications, such IC's generally include a Hall effect sensor with an amplifier, and a discrete capacitor coupled to the amplifier, used to boost the output voltage signal. However, by utilizing a coupling capacitor, the Hall effect IC then becomes responsive to the change in magnetic flux density with respect to time. Thus, in an application as in FIG. 3, such a conventional Hall effect IC, when capacitively coupled to an amplifier, will be unable to provide an output voltage signal immediately upon power up and when the ferrous wheel is rotating very slowly or is stationary.

The present invention solves this problem by using a Hall effect IC 30, such as a Sprague Model No. UGN-3131, UGN-3050 or a Siemens Model No. TLE 4903F, which does not include a coupling capacitor. By eliminating the coupling capacitor, the ferrous object sensor assembly 50 in accordance with the present invention is able to detect the presence of a tooth 45 or notch 61 on a rotatably mounted ferrous wheel 43 at relatively slow and zero speed and thus, also functions as a proximity sensor giving the proper output immediately at power up, without motion of the target object.

The principles of operation of the invention are best understood with reference to FIGS. 8 and 9. FIG. 8 illustrates the magnetic flux pattern between opposing pole faces of a conventional permanent magnet 34. The permanent magnet 34 includes opposing pole faces P' and P'' and a magnetic axis 55 substantially perpendicular to the opposing pole faces P' and P''. As shown in FIG. 8, radial or normal magnetic flux components (components substantially perpendicular to the magnetic axis 55) are zero in a neutral plane at the surface of the magnet, designated as $L_1$, located at approximately the midpoint of the magnet 34, when uninfluenced by a ferrous object. It has also been determined that the radial components of the magnetic flux density increase in opposite polarity at the surface between the neutral plane $L_1$ in a direction toward either pole face as shown in FIG. 14.

When a ferrous object is brought into proximity with a pole face P' or P'', the neutral plane is shifted toward the ferrous object to a position, designated as $L_2$ in FIG. 9. When the ferrous object is moved away from the pole faces the neutral plane will return to its original location at $L_1$. Based on the above, it was determined that the magnetic flux density at points along the lateral surface of the magnet, between the neutral band $L_1$ and the pole faces experience a relatively significant change in magnetic flux density when a ferrous object is moved in the proximity of one of the pole faces. The principles of the present invention utilize this phenomena, found along the lateral surface of the magnet, to apply magnetic flux density changes to a magnetic flux responsive sensor.

In known magnetic flux responsive sensors, temperature change can adversely affect the proper function because such sensor assemblies rely substantially on pole face magnetism directed through their Hall effect sensor. It has been found that at a lateral surface on the magnet, intermediate opposing pole faces, the magnetic flux density change due to temperature effects on the magnet is insignificant. The ferrous object sensor assembly in accordance with the present invention relies substantially on radial components of magnetic flux density emanating from the lateral surface of the permanent magnet, intermediate opposing pole faces, to provide an output signal relatively unaffected by temperature change.

One embodiment of a ferrous object sensor assembly 50 is illustrated in FIGS. 6 and 7. This embodiment comprises a Hall effect IC 30, such as a Sprague Model UGN-3131, UGN-3050 or a Siemens Model No. TLE 4903F, having a sensing plane 32, mounted on the lateral side of a permanent magnet 34 between opposing pole faces, such that the sensing plane 32 is substantially perpendicular to radial magnetic flux components. Depending on the magnetic flux density level required by the IC, the Hall effect IC 30 may be located anywhere between the neutral plane and one of the pole faces where the magnetic flux density satisfies the requirement.

When the ferrous object sensor assembly 50 is used as a threshold device for providing a digital output signal, it is necessary to determine an operable location for the sensing plane 32 on the Hall effect IC 30 along the lateral surface of the magnet 34 intermediate opposing pole faces. More specifically, the Hall effect IC is electrically connected to a light emitting diode (LED) via a pull up resistor. If the Hall effect IC 30 is initially disposed adjacent an area of relatively high magnetic density of the proper polarity on the magnet 34, the LED will illuminate. The Hall effect IC 30 is then moved toward the neutral plane $L_1$ until the LED goes out, which defines the release point. When a ferrous object is brought into proximity with a pole face, the electrical output signal of the Hall effect IC should change. However, if the change in magnetic flux density is insufficient to produce a useful output change, the magnet should be replaced with one having a greater energy product and the sensor should then be repositioned and the above process repeated.

When the ferrous object sensor assembly is used to provide a linear output signal, a linear sensor is used, such as a Hall effect sensor, a linear Hall effect IC, an MRE, a linear MRS, etc. It is known that the output of such linear sensors, under an identical set of influences, will slightly vary in output signal value from individual to individual. An important advantage of the present invention is that the sensor position along the magnet's lateral surface permits the position of the sensor to be adjusted along the lateral surface parallel to the magnetic axis 55 until the final output signal value of the sensor assembly is calibrated to some desired value. This simple position adjustment mitigates error in the final output signal that would exist due to variation among individual sensors.

The Hall effect IC 30 or other magnetic flux responsive sensor may be attached to the lateral surface of the magnet 34 with an epoxy or other known conventional adhesive. A flux concentrator or ferrous piece 54 may be used to enhance or reduce the magnetic flux density directed through the magnetic flux responsive sensor to optimize the sensing range or maximize the working air gap of the assembly. The ferrous piece 54 may be attached to the magnetic flux responsive sensor by any known means, such as an adhesive.

The ferrous piece 54, permanent magnet 34 and magnetic flux responsive sensor may also be positioned relative to each other by any means including various carriers, such as the carrier 38, formed from plastics, ceramics, paper, fiber or metals, various known adhesives, tapes or shrink tubing. An encapsulant may also be used to position the components. The ferrous object sensor assembly 50 may also be protected by enclosing it in a plastic, metal, ceramic or a paper fiber housing 58 with or without encapsulating or potting compounds. The ferrous object sensor assembly may also be cast, overmolded, or insert molded with either thermoset or thermoplastic materials.

The ferrous object sensor assembly in accordance with the present invention may be used in various applications as illustrated in FIGS. 10 through 12. In FIG. 10, the Hall effect sensor assembly 50 is used as a proximity sensor to provide end on proximity sensing of a ferrous target object 56. As shown, the ferrous target object 56 may be moved in a direction either parallel to the magnetic axis 55 or in a direction perpendicular to the magnetic axis 55.

Although FIGS. 11 and 12 illustrate sensing of a rotating ferrous object whose rotational axis is substantially normal to the magnetic axis 55, the principles of the invention are equally applicable when the rotational axis is substantially parallel to the magnetic axis.

In FIG. 11, the ferrous object sensor assembly 50 is used to detect the absence or presence of a tooth 45 on a ferrous wheel 43. Unlike the ferrous object sensors normally used in this application, which utilize an internal or discrete capacitor, the ferrous object sensor assembly 50 in accordance with the present invention is able to detect the presence or absence of a tooth 45 on the ferrous wheel 43 immediately upon power up.

As illustrated in FIGS. 6 and 7, a bar or cylindrical magnet 34 is used. However, it should be appreciated by those of ordinary skill in the art that the cross-section of the permanent magnet 34 is not critical to the practice of the invention. More particularly, magnets 34 having various cross-sectional shapes, such as a D-shaped, round, rectangular, irregular, magnetized with pole faces on opposite sides as shown in FIG. 13, may be used. Also, the cross-section of the magnet 34 need not be uniform along the magnetic axis 55. It can also be tapered or barrel-shaped, for example.

In addition to the embodiments using Hall effect sensors and the like, the principles of the invention are also applicable to various other magnetic flux responsive sensors, such as reed switches, magnetically variable resistance elements (MRE) magnetically variable resistor sensors (MRS), magnetic axial contact switches and the like.

FIG. 15 illustrates an alternative embodiment utilizing a reed switch 100 for a magnetic flux responsive sensor. The reed switch 100 comprises a pair of reed members 102, formed from a magnetic material disposed in a housing 103. The reed members 102 are disposed such that the ends 104 slightly overlap (as illustrated in FIG. 15) and are separated by a small air gap defining a contact arrangement. The other ends 106 form electrical terminals for allowing the reed switch 100 to be connected to an external electrical circuit (not shown).

In accordance with the present invention, the reed switch 100 is positioned such that a sensing plane 32 (FIG. 15) is substantially perpendicular to the magnetic axis 55. Accordingly, the reed switch 100 is positioned adjacent the surface intermediate the pole faces of the magnet 34 such that its longitudinal axis 107 is substantially perpendicular to the magnetic axis 55. Moreover, the reed switch 100 is positioned such that only one of the reed members 102 is disposed with most of its length below the plane of a top surface 110 of the magnet 34 as illustrated in FIG. 15. More particularly, the reed switch 100 is disposed such that the contacts or point at which the reed members 102 overlap is disposed above the plane of the top surface 110 of the magnet 34. The reed switch 100 is positioned at an appropriate position along the surface of the magnet intermediate opposing pole faces to cause the reed switch 100 to either open or close in response to changes in magnetic flux density produced by a ferrous target being moved in and out of proximity with a pole face P' or P".

FIGS. 16, 17 and 18 show other alternative embodiments which utilize a magnetically variable resistive element (also known as a magneto resistive element or MRE) and magneto resistive sensors (MRS) which include an MRE and electronic circuitry. More specifically, FIG. 16 illustrates an MRE 112 with small arrows illustrating a possible internal magnetization orientation of the element and an arrow 114 in the plane of and showing the direction to apply an external magnetic flux field. The sensing plane 32 for the MRE 112 is parallel to the surface 116 as illustrated in FIGS. 16, 17 and 18. In other words, and as more clearly illustrated in FIG. 18, the sensing plane 32 is oriented perpendicular to the magnetic axis 55. Operation is based upon radial components of the magnetic flux density.

FIG. 19 illustrates an axial contact switch 114 having a sensing plane 32. FIG. 20 illustrates another alternative embodiment illustrating a magnetic leaf switch 118 having a sensing plane 32. In both of these embodiments, it is important that the sensors be disposed such that their sensing planes 32 are parallel with radial components of the magnetic flux density emanating from the magnet surface intermediate opposing pole faces and that their sensing planes are perpendicular to the magnetic axis 55. These sensor assemblies, as well as the positioning of the sensor assembly along the magnetic axis is similar to that already described.

To illustrate the operation of the ferrous object sensor assembly in accordance with the present invention, a bar magnet 34 having the dimensions of 0.20 inch×0.20 inch×0.25 inch in the magnetic axis 55 and a strength of approximately 3,550 Gauss was used with a linear Hall effect IC, for example, a model No. UGN 3503, available from Sprague. The output of the Hall effect IC for the following distance of separation of a ferromagnetic object 56 from the end face of the magnet 34 are as shown below in Table 1.

TABLE 1

| Without Flux Concentrator | |
|---|---|
| Air Gap | Gauss |
| .010 | 320.2 |
| .015 | 295.1 |
| .030 | 203.1 |
| .050 | 149.6 |
| .078 | 90.3 |
| .090 | 76.0 |
| .110 | 53.5 |
| .130 | 40.9 |
| .150 | 31.7 |

To illustrate the ability of the flux concentrator 54 of FIG. 6 to extend the range of the present magnetic proximity sensor, the following Table 2 shows the output signal of the above Hall effect IC for a given separation of the ferromagnetic object 56 from the end face of the magnet 34.

TABLE 2

| With Flux Concentrator | | |
|---|---|---|
| Air Gap | Gauss | |
| .010 | 622.0 | The flux concen- |
| .015 | 566.8 | trator was a |

TABLE 2-continued

| With Flux Concentrator | | |
|---|---|---|
| Air Gap | Gauss | |
| .030 | 433.9 | cylindrical shaped |
| .050 | 288.4 | 0.15 inch diameter |
| .078 | 172.2 | 0.275 inch long |
| .090 | 158.0 | |
| .110 | 113.7 | |
| .130 | 83.6 | |
| .150 | 61.8 | |

With the increase of the flux density substantially perpendicular to the sensing plane 32, the air gap between the end of the pole face and the target can be increased while maintaining the values of magnetic flux density change at that sensor position. Thus, increasing the effective working range of the ferrous object sensor assembly mitigates the need for relatively precise mounting between the ferrous target and the ferrous object sensor assembly.

Thus, it should be clear that a novel ferrous object sensor assembly has been described which can detect the presence, absence, or the approach of a ferrous target down to zero speed. The invention is capable of being practiced in various different embodiments, such as a Reed switch or the like, all of which are intended to be within the scope and spirit of the appended claims.

We claim:

1. A ferrous body proximity sensor assembly adapted to sense the presence or absence of a metallic body disposed adjacent one pole face of a magnet for use in a motor vehicle comprising:
    a permanent magnet of a predetermined cross-section having a North pole and a South pole defining opposing pole faces, a lateral surface intermediate the pole faces and a magnetic axis connecting said opposing pole faces for providing magnetic flux emanating from said lateral surface; and
    sensor means having a sensing plane for sensing said magnetic flux emanating from the lateral surface of said magnet applied to said sensing plane and producing an output voltage signal as a function of the change in magnetic flux density applied to said sensing plane resulting from the proximity of said metallic body relative to one of said pole faces; wherein said sensor means is attached to said lateral surface to be substantially responsive to said flux emanating from said lateral surface to substantially reduce the temperature sensitivity of said sensor assembly.

2. A ferrous body sensor as recited in claim 1, wherein said sensor means is a switching type device and provides an electrical output signal when magnetic flux density of a predetermined polarity above a predetermined value is applied to said sensing plane.

3. A ferrous body sensor as recited in claim 1, wherein said sensor means is a switching type device and provides an electrical output signal when magnetic flux of a predetermined polarity below a predetermined value is applied to said sensing plane.

4. A ferrous body sensor as recited in claim 1, wherein said sensor means provides an electrical output signal, linearly related to the change in magnetic flux applied to said sensing plane.

5. A ferrous proximity sensor assembly adapted to sense the presence or absence of a metallic body disposed adjacent one pole face of a magnet for use in a motor vehicle comprising:

a permanent magnet of a predetermined cross-section having a North pole and a South pole defining opposing pole faces, a lateral surface intermediate the pole faces and a magnetic axis connecting said opposing pole faces for providing magnetic flux emanating from said lateral surface; and sensor means having a sensing plane for sensing said magnetic flux emanating from the lateral surface of said magnet and producing an output voltage signal as a function of the change in magnetic flux density applied to said sensing plane resulting from the proximity of said metallic body relative to one of said pole faces; wherein said sensor means is attached to said lateral surface to be substantially responsive to said flux emanating from said lateral surface to substantially reduce the temperature sensitivity of said sensor assembly; and means, rigidly attached to said sensor means, for concentrating said magnetic flux through said sensing means.

6. A ferrous body sensor as recited in claim 5, wherein said concentrating means is attached on a surface of said sensor means opposite said sensing plane.

7. A ferrous body sensor as recited in claim 1, wherein said sensor means is attached to said magnet with an adhesive.

8. A ferrous body sensor as recited in claim 7, wherein said adhesive is an epoxy.

9. A ferrous body sensor as recited in claim 1, wherein said predetermined cross-section is uniform.

10. A ferrous body sensor as recited in claim 9, wherein said predetermined cross-section is circular.

11. A ferrous body sensor as recited in claim 9, wherein said predetermined cross-section is rectangular.

12. A ferrous body sensor as recited in claim 9, wherein said predetermined cross-section is D-shaped.

13. A ferrous body sensor as recited in claim 9, wherein said predetermined cross-section is non-uniform.

14. A Hall effect sensor assembly for use in a motor vehicle for sensing the presence of a tooth or a notch on a ferrous vane or wheel disposed adjacent one pole face of a magnet comprising:
a magnet of a predetermined cross-section having a North pole and a South pole defining opposing pole faces, a lateral surface intermediate the pole faces and a magnetic axis connecting said opposing pole faces for providing magnetic flux emanating from said lateral surface;

means for providing an output voltage signal representative of the proximity of a tooth or notch on a ferrous vane or wheel including a Hall effect sensor as a function of said magnetic flux emanating from said lateral surface of said magnet resulting from the proximity of said tooth or notch to one of said pole faces; and means for attaching said providing means to the surface of said magnet along said magnetic axis, intermediate said opposing pole faces, such that said providing means is substantially responsive to said flux emanating from said lateral surface to substantially reduce the temperature sensitivity of said sensor assembly.

15. A Hall effect sensor assembly as recited in claim 14, further including a ferrous piece attached to said providing means.

16. A Hall effect sensor assembly as recited in claim 14, wherein said predetermined cross-section is uniform.

17. A Hall effect sensor assembly as recited in claim 14, wherein said predetermined cross-section is non-uniform.

18. A Hall effect sensor assembly as recited in claim 14, wherein said providing means includes a Hall effect integrated circuit having a sensing surface which provides an output voltage signal as a function of the change in magnetic flux density applied to said sensing surface.

19. A Hall effect sensor assembly for sensing the presence of a tooth or a notch on a ferrous vane or wheel disposed adjacent one pole face of a magnet comprising:
a magnet of a predetermined cross-section having a North pole and a South pole defining opposing pole faces, a lateral surface intermediate the pole faces and a magnetic axis connecting said opposing pole faces for providing magnetic flux emanating from said lateral surface;

means for providing an output voltage signal in the presence of a tooth or notch on a ferrous vane or wheel disposed adjacent one pole face in a stationary position including a Hall effect sensor as a function of the magnetic flux emanating from the lateral surface of said magnet resulting from the proximity of said tooth or notch to one of said pole faces; and means for attaching said providing means to the lateral surface of said magnet, intermediate opposing pole faces, such that said providing means is substantially responsive to said flux emanating from said lateral surface to substantially reduce the temperature sensitivity of said sensor assembly.

20. A Hall effect sensor assembly as recited in claim 19, wherein said predetermined cross-section is uniform.

21. A Hall effect sensor assembly as recited in claim 19, wherein said predetermined cross-section is non-uniform.

22. A Hall effect sensor assembly as recited in claim 19, wherein said attaching means includes an adhesive.

23. A Hall effect sensor assembly as recited in claim 22, wherein said adhesive is an epoxy.

24. A Hall effect sensor assembly as recited in claim 19, wherein said attaching means is a tape.

25. A Hall effect sensor assembly as recited in claim 19, wherein said attaching means includes a carrier.

26. A Hall effect sensor assembly as recited in claim 25, wherein said carrier is formed from plastic.

27. A Hall effect sensor assembly as recited in claim 25, wherein said carrier is formed from ceramic.

28. A Hall effect sensor assembly as recited in claim 25, wherein said carrier is formed from paper.

29. A Hall effect sensor assembly as recited in claim 25, wherein said carrier is formed from metal.

30. A Hall effect sensor assembly as recited in claim 19, wherein said attaching means includes an encapsulant.

31. A Hall effect sensor assembly as recited in claim 19, wherein said attaching means includes a housing which encloses the assembly.

32. A Hall effect sensor assembly as recited in claim 31, wherein said housing is formed from a plastic.

33. A Hall effect sensor assembly as recited in claim 31, wherein said housing is formed from a metal.

34. A Hall effect sensor assembly as recited in claim 31, wherein said housing is formed from a ceramic.

35. A Hall effect sensor assembly as recited in claim 31, wherein said housing is formed from a paper fiber.

36. A Hall effect sensor assembly as recited in claim 31, further including an encapsulant.

37. A Hall effect sensor assembly as recited in claim 31, further including a potting compound.

38. A Hall effect sensor assembly as recited in claim 19, wherein said attaching means includes casting.

39. A Hall effect sensor assembly as recited in claim 19, wherein said attaching means includes overmolding.

40. A Hall effect sensor assembly as recited in claim 19, wherein said attaching means includes insert molding.

41. A Hall effect sensor assembly as recited in claim 19, wherein said providing means includes a Hall effect sensor integrated circuit which provides an output voltage signal as a function of the change in magnetic flux density applied to the sensor.

42. A method for detecting the presence of a tooth or notch on a ferrous vane or wheel disposed adjacent one pole face of a magnet comprising the steps of:
 (a) providing a magnet having North and South poles defining opposing pole faces, a lateral surface therebetween and a magnetic axis connecting said opposing pole faces for generating a source of magnetic flux emanating from said lateral surface;
 (b) attaching a Hall effect sensor intermediate said opposing pole faces of the magnet forming an assembly such that said Hall effect sensor is substantially responsive to said flux emanating from said lateral surface to substantially reduce the temperature sensitivity of said sensor to provide an output voltage signal representative of a change in the magnetic flux density emanating from said lateral surface resulting from the proximity of said tooth or notch to one of said pole faces; and
 (c) disposing said assembly such that one or the other of said pole faces is disposed adjacent said tooth or notch.

43. A method for making a Hall effect sensor assembly adapted to sense the presence or absence of a tooth on a ferrous vane or wheel adjacent one pole face of a magnet comprising the steps:
 (a) providing a magnet having North and South poles defining opposing pole faces and a lateral surface therebetween for generating magnetic flux emanating from said lateral surface;
 (b) providing a Hall effect sensor which generates an output voltage signal in response to a change in magnetic flux density emanating from said lateral surface resulting from the proximity or absence of said tooth or notch to one of said pole faces; and
 (c) attaching said sensor to said lateral surface of the magnet so as to be substantially response to said flux emanating from said lateral surface to substantially reduce the temperature sensitivity of said sensor.

44. A magnetic flux responsive proximity sensory assembly adapted to sense the presence or absence of a metallic body disposed adjacent one pole face of a magnet comprising:
 a permanent magnet of predetermined cross-section having a North pole and a South pole defining opposing pole faces, a lateral surface therebetween and a magnetic axis connecting said opposing pole faces for providing magnetic flux emanating from said lateral surface; and
 sensor means, having at least one sensing plane disposed substantially perpendicular to said magnetic axis, for sensing magnetic flux emanating from said lateral surface resulting from the presence or absence of said metallic body to one of said pole faces; wherein said sensor means is attached to said lateral surface to be substantially responsive to said flux emanating from said lateral surface to substantially reduce the temperature sensitivity of said sensor means.

45. The assembly of claim 44 wherein said sensor means includes means for sensing magnetic flux of one polarity.

46. The assembly of claim 44 wherein said sensor means includes means for sensing bipolar magnetic flux.

47. The assembly of claim 44 wherein said sensor means includes a reed switch.

48. The assembly of claim 44 wherein said sensor means includes a magnetic leaf switch.

49. The assembly of claim 44 wherein said sensor means includes a magnetic axial contact switch.

50. The assembly of claim 44 wherein said sensor means includes a magneto resistance sensor.

51. The assembly of claim 44 wherein said sensor means includes a magnetically variable resistive element.

52. The assembly of claim 51 wherein said sensing plane is parallel to an internal magnetization plane of said magnetically variable resistive element.

53. The assembly of claim 44 wherein said sensing plane is parallel to radial components of the magnetic flux density emanating from a magnetic surface intermediate said pole faces.

54. A ferrous body proximity sensor assembly adapted to sense the presence or absence of a metallic body disposed adjacent one pole face of a magnet comprising:
 a magnet of a predetermined cross-section having a North pole and a South pole defining opposing pole faces, a lateral surface intermediate the pole faces and a magnetic axis connecting said opposing pole faces for providing magnetic flux emanating from said lateral surface; and
 sensor means having a sensing plane for sensing magnetic flux applied to said sensing plane and producing an output voltage signal as a function of the magnetic flux applied to said sensing plane emanating from said lateral surface resulting from the presence or absence of said metallic body to one of said pole faces; said sensor means attached to said lateral surface to be substantially responsive to said flux emanating from said lateral surface to substantially reduce the temperature sensitivity of said sensor means.

* * * * *

UNITED STATES PATENT AND TRADEMARK OFFICE
CERTIFICATE OF CORRECTION

PATENT NO. : 4,970,463
DATED : November 13, 1990
INVENTOR(S) : Wolf et al.

It is certified that error appears in the above-identified patent and that said Letters Patent is hereby corrected as shown below:

Col. 10, line 65, "proximity" should read --body--;

Col. 11, line 6, "and" should be deleted;

Col. 13, line 53, "proximity" should read --presence--; and

Col. 13, line 62, "sensory" should read --sensor--.

Signed and Sealed this

Seventh Day of April, 1992

Attest:

HARRY F. MANBECK, JR.

*Attesting Officer*  *Commissioner of Patents and Trademarks*